United States Patent [19]

Cox et al.

[11] 4,053,868
[45] Oct. 11, 1977

[54] VEHICLE SYSTEM MONITOR

[75] Inventors: Harrison F. Cox, East Peoria;
Thomas E. Cochran, Yorkville;
Lawrence F. Fratzke, East Peoria;
Joe E. Fuzzell, Peoria, all of Ill.

[73] Assignee: Caterpillar Tractor Co., Peoria, Ill.

[21] Appl. No.: 754,816

[22] Filed: Dec. 27, 1976

[51] Int. Cl.² .............................................. G08B 19/00
[52] U.S. Cl. ................................. 340/52 F; 340/412;
307/10 R
[58] Field of Search ................... 340/52 F, 53, 57, 58,
340/213 R, 267 R, 412, 414, 415, 420; 307/10 R

[56] References Cited
U.S. PATENT DOCUMENTS

| 3,864,578 | 2/1975 | Lackey | 307/10 R |
| 3,949,356 | 4/1976 | Fuzzell et al. | 340/52 F |
| 4,001,776 | 1/1977 | Carol, Jr. et al. | 340/52 F |

Primary Examiner—Alvin H. Waring
Attorney, Agent, or Firm—Phillips, Moore, Weissenberger, Lempio & Majestic

[57] ABSTRACT

A monitor system for indicating the existence of one or more undesirable operating conditions of an engine-powered vehicle, and including three separate indicator panels. The first panel is energized prior to starting the engine and indicates individual prestart-condition faults, the indicators being disabled after the engine is in operation. The second panel indicates individual operating-condition faults and gives warnings of a different magnitude depending on the criticality of the faults. The third panel is for service faults and latches service-fault indications for general presentation to the vehicle operator and individual presentation to service personnel after the vehicle has been shut down.

16 Claims, 6 Drawing Figures

FIG. 3A

FIG_4

VEHICLE SYSTEM MONITOR

BACKGROUND OF THE INVENTION

This invention relates to motorized vehicles and more particularly to a monitor system which indicates the presence of undesirable conditions in the engine or other vehicle components.

In motorized vehicles of virtually all kinds, instruments are employed to detect the presence of various undesirable operating conditions such as overheating of the engine, low oil pressure, low fuel and the like, and indicators are provided to give warning to the vehicle operator of such condition. In some vehicles similar instruments and indicators are provided to indicate operating faults distinct from the engine. In earthmoving vehicles for example, when the engine operates a pump to supply pressurized fluid to hydraulic cylinders for manipulating elements of the vehicle, instruments may be present to indicate a low level of hydraulic fluid in the supply reservoir, an overheating of the hydraulic fluid, a clogging of the hydraulic fluid filter and so on.

The importance of the various monitored conditions varies, both as to criticality and as to time in relation to the operation of the vehicle. For example, the levels of the various fluids such as engine oil, transmission fluid, hydraulic fluid and coolant fluid should be checked and deficiencies corrected prior to start-up of the vehicle. Operating conditions such as brake pressure, coolant temperature, fuel level, whether the parking brake is on and the like should be monitored prior to and during the time the vehicle is in operation. Some operating conditions are more critical than others, insofar as the need for immediate action on the part of the operator is required. The existence of a low alternator output would be an example of a relatively noncritical condition. The operator should be warned of such condition, but no immediate corrective action would be needed. On the other hand, a loss of brake pressure would require the operator to take immediate steps to prevent damage to the vehicle. Other conditions may arise and be detectable when the vehicle is in operation, such conditions indicating a need for servicing the vehicle when it is returned to the shop. For example, the oil filter may clog during vehicle operation and need cleaning or replacement when the vehicle is through for the day.

Heretofore, monitor systems have detected the undesired conditions and then signaled the vehicle operator by means of dial indicators, indicator lamps or audible means. The efficiency of these systems is greatly dependent upon the operator's careful attention to all of the various indicators and upon his judgment as to which may call for immediate correction and which may be deferred. In general, the more complex the vehicle and its auxiliary equipment, the greater is the number of operating conditions that should be monitored. At the same time, the more complex the vehicle, the less the time the operator will have to observe the greater number of various indicators since he will be more immediately concerned with direct vehicle operation.

Thus, with an increasing amount of instrumentation, a definite problem exists as to how the existence of undesirable conditions can be detected and presented to the operator without a need of his part to give greater attention, which he does not have, to such instrumentation and make more value judgments relative to the existence of undesirable conditions.

SUMMARY OF THE INVENTION

The present invention is directed to overcoming one or more of the problems as set forth above.

According to the present invention, different indicator panels are provided, one for prestart conditions, one for operating conditions and one for service conditions. The prestart-condition panel gives individual warnings to the operator of fluid level deficiencies which should be remedied before the engine is started. This panel does not function during engine operation so that the operator is not distracted thereby. The operating-condition panel gives individual warnings to the operator of faults relating to operation of the vehicle and is energized during such operation. The service-condition panel indicates faults which arise during vehicle operation and latches them so that the fault indication will remain after the vehicle is shut down. The service-condition panel may be located remotely from the operator so that he is not distracted thereby during operation of the vehicle.

Also according to the invention, the system discriminates between different operating conditions and provides one type of warning if a noncritical fault exists and another, more imperative, warning if a critical fault exists.

Also according to the invention, a general low-level warning is given to the vehicle operator of the presence of any service-condition fault.

Also according to the invention, all of the indicators of the various panels may be easily tested at any time the panels are energized to see if the indicators are all in working order.

Thus according to the invention, a monitor system is provided which presents fault indications of a large number of vehicle conditions in a manner providing least distraction to the operator, least necessity on his part to maintain vigilance over the indicators and least need for his value judgments as to the degree of criticality of the fault.

BRIEF DESCRIPTION OF THE DRAWINGS

In the drawings, forming a part of the application and in which like parts are designated by like reference numerals throughout the same.

DESCRIPTION OF THE PREFERRED EMBODIMENT

Figure 1:
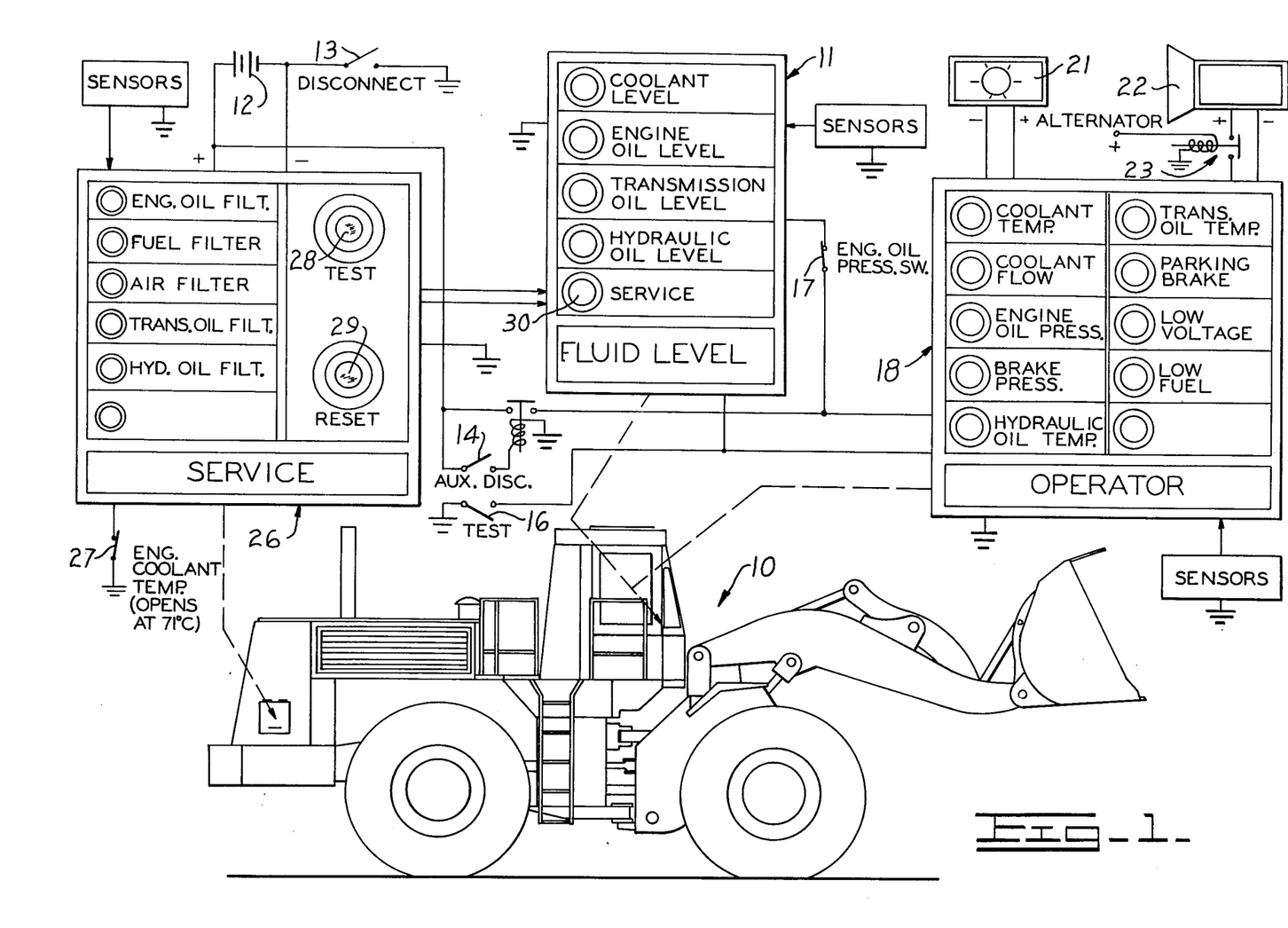
FIG. 1 is a combined block schematic diagram of the monitor system showing location of components on a typical earthmoving vehicle.

Referring now to the drawings, FIG. 1 illustrates in general the monitor system of the present invention and the location of the various components thereof in a typical earthmoving vehicle, specifically shown herein as a wheel loader 10.

The monitor system functions to monitor operating conditions for the engine, transmission, electrical systems and accessory functions and to provide visual and/or audible indications of the existence of a fault.

The Fluid Level panel 11 is mounted on the vehicle at the operator location, which in the case of the disclosed vehicle 10 would be the vehicle cab, and groups the indicators for the monitors of the level of coolant, engine oil, transmission oil and hydraulic fluid. The information from this panel is particularly of concern in prestart servicing. The panel 11 is energized from the vehicle battery 12 upon closure of the main and auxiliary disconnect switches 13 and 14. If any of the fluid levels is low, visual indication of such low level is provided to the operator so that the condition can be remedied before the vehicle is put into operation. A dash-mounted test switch 16 is provided in the cab so that the operator can test the indicators to see if they are operable. If the indicators are in fact operable, and no low fluid-level condition exists, the vehicle may be put into operation. A normally closed switch 17 will open when the engine oil pressure builds up and removes the power to the Fluid Level panel.

The Operator panel 18 is provided in the vehicle cab and groups the indicators for malfunctions which might occur during operation of the vehicle. If the temperature of the transmission oil or the hydraulic oil becomes excessive, or if the fuel is low or the output of the vehicle alternator 19 (FIG. 2) is low, a low-intensity visual indication of the particular fault will be provided and a master light 21 of greater intensity will flash to attract the attention of the operator to the existence of a fault.

Additionally, if the engine oil pressure is too low, or the coolant flow is too little, or the coolant temperature is too high, or the brake air or oil pressure is lost or if the parking brake is on, the master light 21 will flash and a low intensity visual indication of the particular fault will be provided. These faults are more critical and any one or more of these faults will also cause the warning horn 22 to sound so that the fault indication cannot be overlooked. The horn is interlocked with the alternator, by means of relay 23 so that the horn will not operate unless the engine is running and the alternator is producing a voltage.

The dash-mounted Test switch 16 enables the operator to check at any time during vehicle operation to see if all of the operating condition indicators are operable.

The Service panel 26 is located remotely from the cab and is available primarily for maintenance personnel in servicing the vehicle after it returns from use. This panel monitors the pressure differential across the various filters of the vehicle system, e.g., the engine oil, fuel, air, hydraulic fluid and transmission fluid filters and provides a visual indication for each filter if it is clogged and needs cleaning or replacement. A normally closed coolant temperature switch 27 is provided to disable the indicators until the coolant temperature has risen to above 71° C., in order to prevent spurious fault signals which might occur if the fluids are cold and sluggish.

The Service panel is continuously energized from the battery and provides a latched indication of a fault which will exist even though the disconnect switches 13 and 14 are opened and the vehicle is shut down. The Service panel is provided with a Test switch 28 so that the maintenance personnel may verify that all Service indicators are operable and a Reset switch 29 by which the fault indications can be restored after the filters have been serviced.

If one or more of the filters monitored by the Service panel 26 requires servicing, a low-intensity indicator light 30 will be lit on the Fluid Level panel 11 in the vehicle cab so that the vehicle operator will be aware of this fact and can report it to the maintenance personnel on his return.

In the present system, warnings of three different degrees of intensity are given to the vehicle operator during operation of the vehicle. If any service-condition fault arises, the low-intensity light 30 will be energized. If a noncritical operating-condition fault occurs, the high-intensity light 21 will flash on and off. If a critical operating-condition fault exists, the light 21 will flash and in addition the horn 22 will sound.

Figure 2:
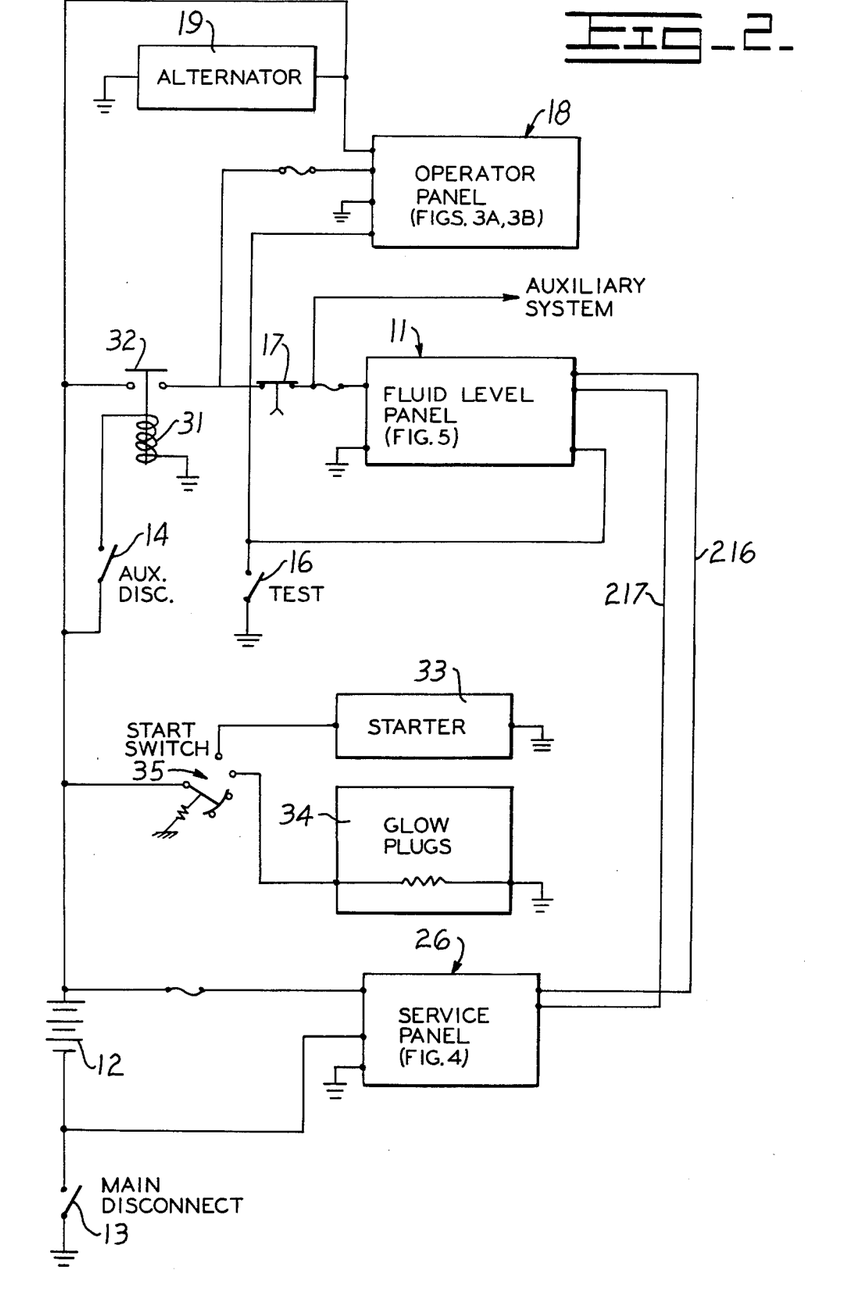
FIG. 2 is a diagram of the vehicle power supply system and its relation to the panels of the monitor system.

FIG. 2 illustrates the vehicle power supply. Closure of the auxiliary disconnect switch 14 energizes relay coil 31 to close relay contacts 32 so that battery power is supplied to the Operator and Fluid Level panels 18 and 11. The usual starter 33 and glow plugs 34 are provided for the vehicle engine, these being energizable from the battery upon closure of the main disconnect switch 13 and start switch 35.

OPERATOR PANEL

Figure 3A:
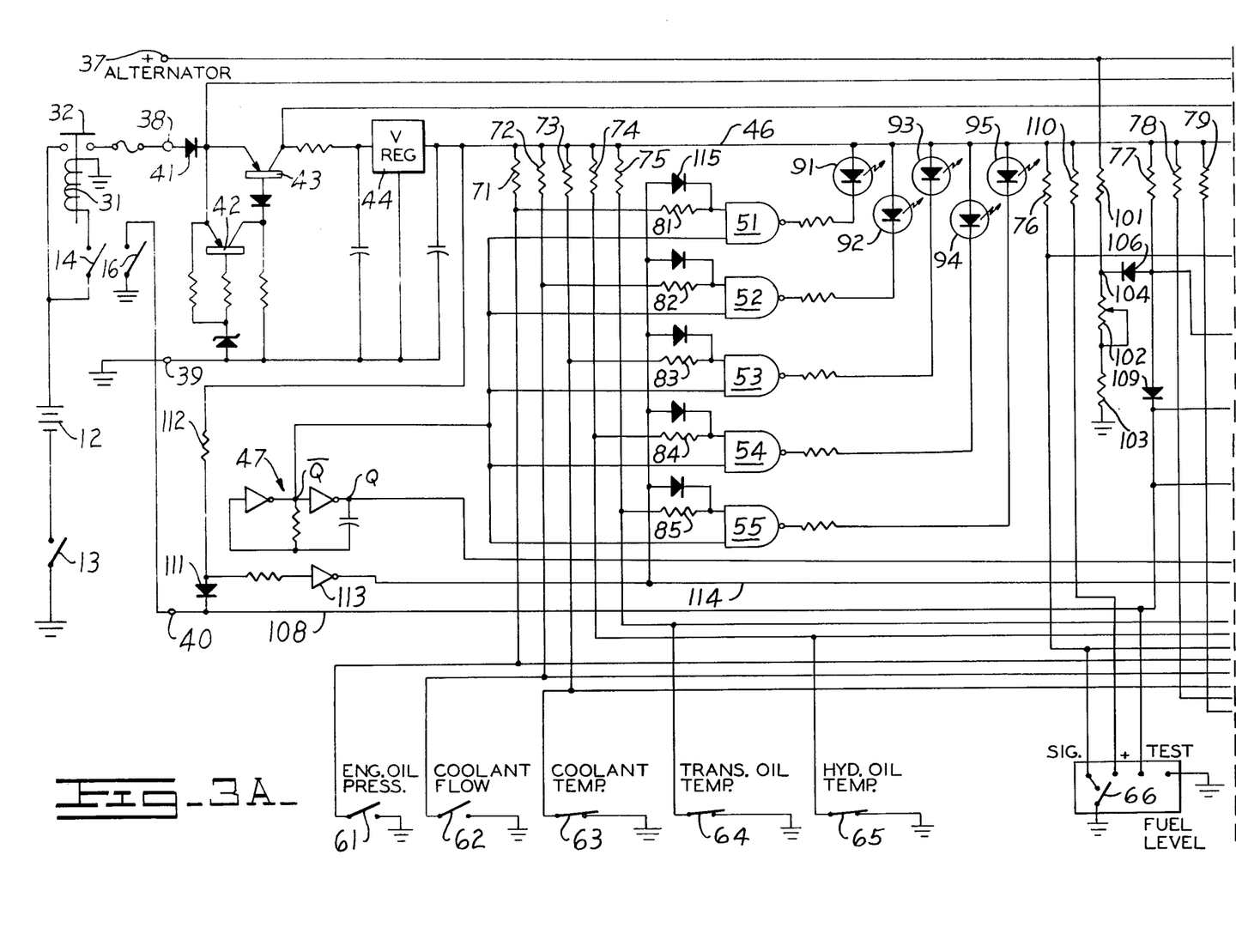
FIGS. 3A and 3B are circuit diagrams of the operator panel and the operating-condition-responsive sensors monitored thereby.
Figure 3B:
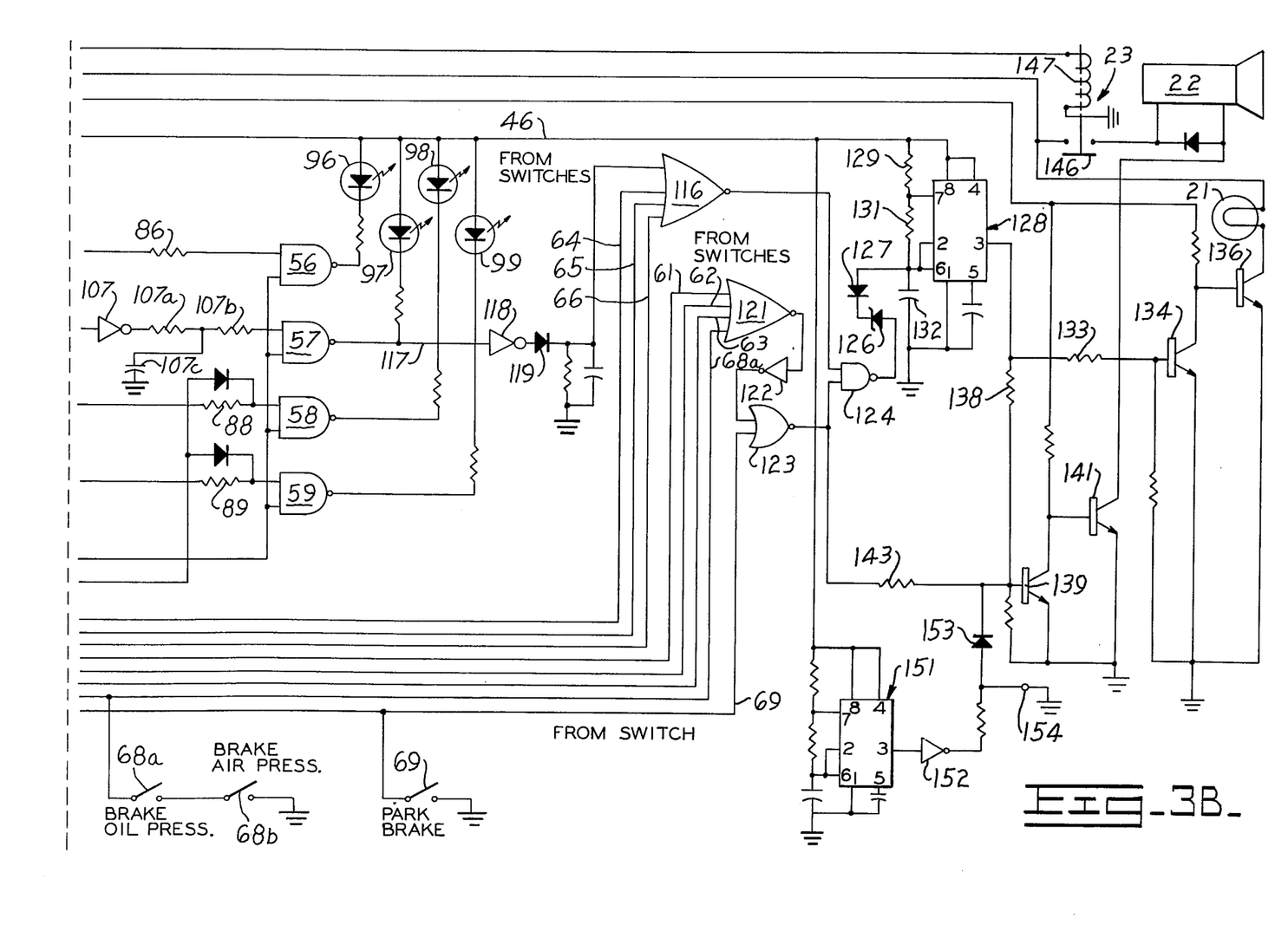

The circuits of the Operator panel 18 are shown in FIGS. 3A and 3B. This panel has terminal 37 connected to the positive terminal of the vehicle alternator 19, terminal 38 connected to the positive side of battery 12 through relay contacts 32, terminal 39 connected to ground and terminal 40 connected to Test switch 16.

Battery voltage is applied through terminal 38 and diode 41 to transistors 42 and 43. If the battery voltage is excessive transistor 42 is turned on to turn off the normally conducting transistor 43. This will safeguard the voltage regulator 44 and the remainder of the Operator panel circuits powered therefrom in the event of transient pulses from the charging circuit (not shown) for battery 12. Otherwise, voltage regulator 44 provides a regulated positive voltage on bus 46.

An inverter oscillator 47 is provided and continuously oscillates at a frequency of about 11 or 12 Hz. The oscillating $\overline{Q}$ output is applied to one of the inputs of each of NAND gates 51, 52, 53, 54 and 55, while the Q output is applied to one of the inputs of each NAND gates 56, 57, 58 and 59.

A multiple of condition-sensing switches 61–66, 68a, 68b and 69 provide inputs to the Operator Panel circuitry shown on FIGS. 3A and 3B. The switches are shown in the state for a condition where disconnect switches 13 and 14 are open, the vehicle engine is shut down and the parking brake is set. Switches 61, 62, 68a, 68b are conventional normally open devices which close when the engine is running and engine oil pressure, coolant flow, brake oil pressure, and brake air pressure are normal. Switch 66 is a conventional Robertshaw electronic fluid level switch that closes when energized by closure of disconnects 13 and 14 if fuel level is proper. Switches 63, 64, 65 are normally closed thermal trip devices that open only when the temperature of the medium in which they are located exceeds a specific value. Switch 69 is a normally closed device that opens when the vehicle parking brake is set. When the vehicle is operational and the Operator Panel circuitry is energized, all sensor switches are closed to ground if the conditions sensed are normal.

The engine oil pressure switch 61 is connected through resistor 71 to buss 46. Switch 61 is a conventional, normally open, pressure-actuated switch which is closed when oil pressure is normal but which will open in the event of insufficient oil pressure. The lower end of resistor 71 is connected by resistor 81 to the output input of NAND gate 51. When the oil pressure switch 61 is closed, the lower end of resistor 71 is grounded, and this low input to NAND gate 51 will cause its output to be high (and at the potential of bus 46). As a consequence, there will be no voltage differential across the light-emitting diode (LED) 91 and it will not be lit. In the event that switch 61 opens in response to low oil pressure, the lower end of resistor 71 will be ungrounded and a high will be inputted into gate 51. Each time then that the $\overline{Q}$ output of oscillator 47 goes high (11 or 12 times per second), the output of gate 51 will go low, causing LED 91 to be energized.

In like manner, switches 62–66, 68a, 68b and 69 are connected by resistors 72–76, 78 and 79 to bus 46, and the lower ends of those resistors are connected through resistors 82–86, 88 and 89 to NAND gates 52–56, 58 and 59. Any of the LED's 92–96, 98 and 99 will be energized in response to the opening of a closed switch associated therewith in a manner as set forth above.

The monitoring circuit for the alternator voltage is somewhat different. Resistors 101, 102 and 103 are connected from the positive terminal of the alternator to ground, resistor 102 being adjustable to set the voltage level of junction 104. Junction 104 is connected by diode 106 and resistor 77, to positive bus 46, and the lower end of resistor 77 is connected through inverter 107 to NAND gate 57. If the junction 104 is above the potential on bus 46, diode 106 will be back-biased so that inverter 107 will have a high input and low output. If the voltage at junction 104 drops below bus 46 potential, the anode voltage of diode 106 will likewise drop. When the voltage at junction 104 is indicative of a low alternator voltage fault, the input to inverter 107 will be sufficiently low as to cause the inverter to output a high to NAND gate 57. The gate then outputs a low to energize LED 97 each time the $\overline{Q}$ voltage from oscillator 47 is high.

The LED's 91–99 can be tested by closing the Test switch 16 and grounding the negative test bus 108 connected to terminal 40 of the panel. This bus is connected through diode 109 to the input of inverter 107, so that when the terminal is grounded, the input of inverter 107 goes low causing NAND gate 57 to output a low on each high pulse from oscillator 47 and thereby cause LED 97 to be energized. Resistors 107a and 107b and capacitor 107c delay the application of a high input to gate 57 from inverter 107 to provide for noise suppression.

The low test voltage at terminal 40 and bus 108 is also applied to the "test" terminal of the conventional Robertshaw electronic fuel-level switch, which causes its switch 66 to open. Such opening causes LED 96 to be energized as if a low fuel condition existed. The positive terminal of the switch is connected to the positive bus 46 through resistor 110.

The test bus 108 is also connected through diode 111 and resistor 112 to the positive bus 46. When terminal 40 is grounded, the anode of diode 111 goes low and inverter 113 will output a high voltage to the positive test bus 114. This high voltage is applied through diode 115 to NAND gate 51, and through corresponding diodes to the other gates 52–55, 58 and 59, to simulate a fault condition and cause the outputs of all of these gates to go low and to thereby energize the LED's associated therewith.

Thus the closing of Test switch 16 causes all LED's 91–99 to be energized so that the operator can be assured the fault-detecting indicators are in operable condition.

The leads from the condition-responsive switches 64, 65 and 66 extend onto FIG. 3B and are applied to the input of NOR gate 116. The output of the low-alternator-voltage NAND gate 57, FIG. 3A, is connected by lead 117 to the input of inverter 118, FIG. 3B, the output of inverter 118 being connected through diode 119 to the remaining input of NOR gate 116.

The monitored conditions applied to gate 116 are regarded as non-critical conditions. Under normal operations, all inputs to NOR gate 116 will be low, and this gate will output a high. If any one of these inputs is high, as will happen if a fault occurs, gate 116 will output a low.

The leads from switches 61, 62, 63 and 68a extend to FIG. 3B and are applied to the inputs of NOR gate 121. Normally, all inputs are low and the output of gate 121 will be high. The output of gate 121, inverted by inverter 122, is applied to the input of NOR gate 123, along with the lead from switch 69. If there is a fault in any of these critical conditions, its corresponding input to gate 121 or 123 will go high and the output of gate 123 will go low.

The outputs of the noncritical-condition gate 116 and the critical-condition gate 123 are both applied to the inputs of NAND gate 124. With no fault existing, both of the inputs to gate 124 will be high and the output of this gate will be low. Any fault, critical or noncritical, will cause the output of gate 124 to go high.

The output of gate 124 is coupled by zener diode 126 and diode 127 to pin 6 of timer 128 which is connected for astable oscillation at a frequency determined by the values of the resistors 129 and 131 and capacitor 132 in its external circuit. If desired, a commercially available Signetics SE 555 Monolithic linear integrated timer circuit may be used for timer 128.

With no fault conditions existent, and with a low output from NAND gate 124, diode 127 will prevent capacitor 132 from charging to the threshold level of the timer and will thus keep it from oscillating. The timer output, at pin 3, will be high. If a fault condition exists, the output of gate 124 will go high, allowing capacitor 132 to charge sufficiently to start the timer into operation. The values of resistors 129 and 131 are preferably chosen so that when timer 128 does oscillate, its output will be high for 2 seconds and then low for 1 second during a cycle of oscillation.

The output of timer 128 is coupled by resistor 133 to a transistor 134. With a normally high output from the timer, transistor 134 will be in conduction and transistor 136 will be held off. When a fault exists, transistor 134 will be turned off during the 1-second low output from timer 128 and transistor 136 will be turned on, to complete the power circuit to master light 21.

Thus, the existence of any fault in a condition monitored by the Operator panel will cause the master light 21 to flash on and off at the rate and for the duration determined by timer 128. The presence of the visual signal from the relatively high-intensity light 21 will alert the operator and he can then inspect the relatively low-intensity LED's 51 through 99 to see what the specific fault is.

The output of timer 128 is also connected through resistor 138 to a transistor 139 so that the horn 22, whose operating coil is in series with a transistor 141, may be energized in response to the existence of a critical fault. The output of the critical-condition NOR gate 123 is also coupled by resistor 143 to the base of transistor 139.

If a critical fault exists, the low output from both the critical-condition gate 123 and timer 128 will cause transistor 139 to turn off and turn transistor 141 on so that the horn is energized.

If a noncritical fault exists, the normally high output from the critical-condition gate 123 will continue to be applied to the base of transistor 139 to maintain it in conduction even though the output of timer 128 went low in response to the existence of the noncritical fault. Thus, the horn will not be energized for a noncritical fault.

In order to prevent the horn from sounding when the engine is not running, the power circuit to the horn is completed through normally open relay contacts 146. These contacts are closed when relay coil 147 is energized, which will occur only when the alternator 19 is being driven by the engine.

In the event the horn 22 is not equipped with an internal oscillator, oscillator 151 in the Operator panel is utilized for this purpose. Oscillator 151 is a timer, similar to the timer 128, connected as a free-running astable oscillator and oscillating at a frequency suitable for horn operation. The output of oscillator 151 is inverted by inverter 152 and applied through diode 153 to the base of transistor 139. If the output of inverter 152 is not grounded at terminal 154, as shown in FIG. 3B, then repeated positive pulses will be applied to transistor 139 through diode 153 to repeatedly turn the transistor on during the 1-second periods of time that the output of gate 123 and timer 128 are both low. If the horn 22 does have an internal oscillator, terminal 154 is grounded so that oscillator 151 will have no effect on transistors 139 and 141.

SERVICE PANEL

Figure 4:
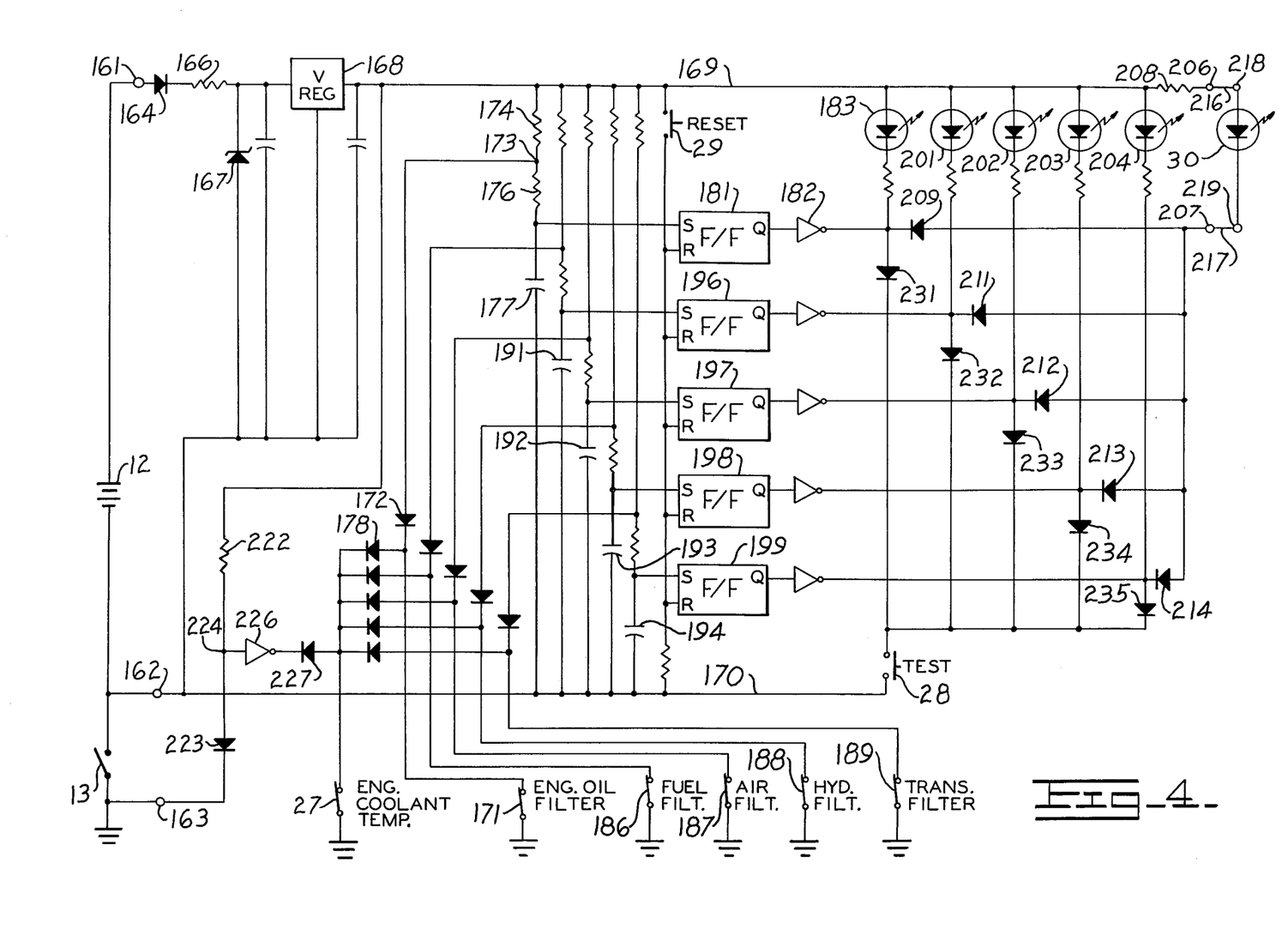
FIG. 4 is a circuit diagram of the service panel and the service-condition-responsive sensors monitored thereby.

The circuits of the Service panel 126 are shown in FIG. 4. This panel has terminal 161 connected directly to the positive side of battery 12, terminal 162 connected directly to the negative side of the battery, and terminal 163 connected to ground.

Battery voltage is applied through diode 164 and resistor 166 to zener diode 167 and voltage regulator 168. Zener diode 167 provides protection for the regulator against over-voltage conditions of the vehicle electrical system. A regulated positive voltage appears on bus 169, while negative battery voltage appears on bus 170.

The condition of the engine oil filter is monitored by means of a pressure-responsive switch 171 which is normally closed and which will open, by conventional means not shown, when the pressure differential across the filter exceeds a predetermined amount — indicating the existence of a clogged filter which needs cleaning or replacement. This switch is connected through diode 172 to the junction 173 between resistors 174 and 176 which are connected in series with capacitor 177 between the positive and negatave buses 169 and 170. When switch 171 is closed, it grounds junction 173 and prevents capacitor 177 from charging.

Junction 173 is also grounded through diode 172, diode 178 and the engine coolant temperature switch 27. This switch is closed when the coolant temperature is below 71° C. and will prevent any fault detection when the engine and fluids are cold. When the coolant temperature reaches 71° C., switch 27 will open and allow fault detection to occur.

If, after the engine coolant temperature switch 27 has opened, the engine oil filter switch 171 should open, because of excessive pressure differential across the filter, junction 173 will be ungrounded, and capacitor 177 can charge through resistors 174 and 176. The voltage across capacitor 177 is applied to the set input of flip-flop 181, and when in due course the voltage has risen sufficiently, a set signal is applied to this flip-flop to cause its Q output to go high. Once set, the Q output will remain latched high until a high signal is applied to the reset input of the flip-flop, even though the set signal may be removed, as by a reclosure of switch 171 or switch 27.

The high Q output of flip-flop 181 is inverted by inverter 182 and applied to LED 183, causing it to be energized for as long as the Q output of flip-flop 181 remains high.

In like manner, opening of any of the normally closed switches 186, 187, 188 or 189 associated with the fuel, air, hydraulic fluid and transmission fluid filters will enable capacitors 191, 192, 193 or 194 to charge and apply a set voltage to flip-flops 196, 197, 198 or 199 so that the inverted Q outputs thereof will energize LED's 201, 202, 203 or 204, respectively.

The Service panel is provided with two output terminals 206 and 207, terminal 206 being connected through resistor 208 to the positive bus 169, and terminal 207 being connected to the inverted outputs of flip-flops 181, 196, 197, 198 and 199 by diodes 209, 211, 212, 213 and 214. Terminals 206 and 207 are connected by leads 216 and 217 to terminals 218 and 219 of the Fluid Level panel 11, and LED 30 of the Fluid Level panel is connected therebetween.

If any of the inverted outputs of the flip-flops goes low, the voltage at terminal 207 will go low, energizing the low-intensity LED 30 in the vehicle cab so that the operator there will be apprised that the Service panel has detected a service-condition fault.

Since the positive bus 169 is continuously energized from the positive side of the battery 12 and the negative bus 170 is continuously connected to the negative side of the battery, the Service panel circuits will be energized whether the disconnect switches 13 and 14 are open or closed. As a consequence, once a flip-flop has been set and its associated LED has been energized, the LED will remain lit after the vehicle has been shut down.

In order to prevent any unlit LED's from being energized when the vehicle is shut down, the following circuit is provided. The positive bus 169 is connected through resistor 222 and diode 223 to ground. When the main disconnect switch 13 is closed the current flow through resistor zzz and diode 223 will maintain the junction 224 therebetween at essentially ground potential, so that the output of inverter 226 is high. When the main disconnect switch 13 is opened, the circuit through resistor 222 and diode 223 will be broken, junction 224 will go high and the output of inverter 226 will go low to provide a path to the negative bus 170 through diode 227. Thus, junction 173 in the RC circuit for the set input to flip-flop 181 will be low through diodes 172, 178 and 227 and will prevent capacitor 177 from charging when the main disconnect switch is opened. Similarly diode 227 will prevent the capacitors for any of the other flip-flops from charging when the main disconnect switch is opened.

After maintenance, any energized LED can be extinguished by closing the reset switch 29, which applies the positive voltage on bus 169 to the reset input of all of the flip-flops.

The operability of the LED's can be checked at any time by closing the test switch 28. Diodes 231, 232, 233, 234 and 235 will connect the LED's through the test switch to the negative bus 170 and cause them all to be energized. Failure of any LED to light when the test switch is closed will indicate the need for that LED to be replaced.

FLUID LEVEL PANEL

Figure 5:
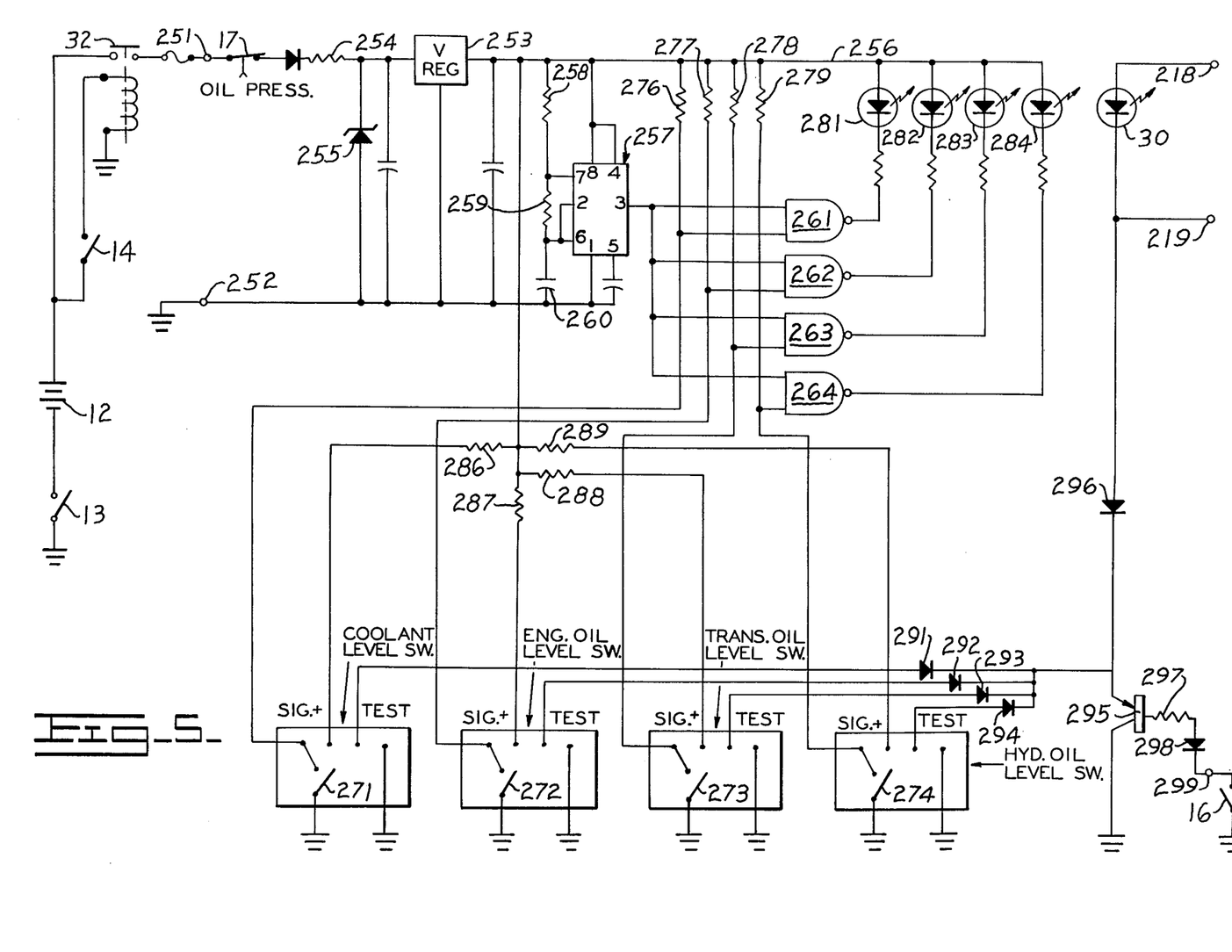
FIG. 5 is a circuit diagram of the fluid level panel and the fluid-level-condition-responsive sensors monitored thereby.

The circuits of the Fluid Level panel 11 are shown in FIG. 5. This panel has a terminal 251 connected to the positive side of battery 12 through the auxiliary disconnect relay contacts 32, and a terminal 252 connected to ground. As a consequence, both disconnect switches 13 and 14 must be closed to provide power to the Fluid Level panel. Power is delivered to voltage regulator 253 through the engine oil pressure switch 17. This switch will open once the engine has been started and the oil pressure has built up, so that the Fluid Level panel is only powered during initial start-up operations. Resistor 254 and zener diode 255 protect the voltage regulator 253 against transient spikes from the vehicle electrical system, and the regulated output from voltage regulator 253 is applied to positive bus 256.

Timer 257 is connected for free-running, astable oscillation, resistors 258 and 259 and capacitor 260 being selected so that the timer will oscillate at about 11 or 12 Hz. The oscillating output of the timer is applied to one of the inputs of each of the NAND gates 261, 262, 263 and 264.

The signal terminals from the coolant level, engine oil level, transmission oil level and hydraulic oil level switches 271, 272, 273 and 274 are connected to the positive bus 256 by resistors 276, 277, 278 and 279, respectively. The junction of each switch and its associated resistor is connected to the other input of one of the NAND gates 261-264. When all of the switches are closed, as they will be if the fluid levels are proper, each NAND gate will have one of its inputs continuously grounded so that all gates will have a high output, thus preventing any of the LED's 281-284 from being energized. If one of the monitored fluid levels is low, its switch will open. For example, if the engine oil level is low, switch 272 will open, removing the ground connection therethrough. Positive bus voltage will be applied through resistor 277 to the lower input to NAND gate 262. Each time that timer 257 outputs a high, the output of gate 262 will go low to energize LED 282. Accordingly, LED 282 will be pulsed at the rate of timer 257 if the engine oil level is low. The other LED's will similarly be pulsed if their associated fluid levels are low.

As discussed previously, LED 30 in the Fluid Level panel will be energized if a Service Panel fault exists. LED 30 is powered from the Service panel and will continue to be so powered even though the oil pressure switch 17 opens and removes power from the Fluid Level panel.

The positive terminals of the fluid level switches are connected to positive bus 256 through resistors 286, 287, 288 and 289, and the test terminals are connected through diodes 291, 292, 293 and 294 to the emitter of transistor 295. The negative side of LED 30 is also connected to the emitter by diode 296. The base of transistor 295 is connected by resistor 297 and diode 298 to terminal 299, which is connected externally to the dash-mounted test switch 16. Closure of the test switch will ground the base of transistor 295, causing it to turn on so that the cathodes of diodes 291–294 and 296 are grounded. LED 30 will be energized. The test terminals of all of the fluid level switches will also be grounded, which opens the switches 271–274 so that LED's 281–284 will also all be energized.

The embodiments of the invention in which an exclusive property or privilege is claimed are defined as follows:

1. An improvement in a monitor system for an engine-powered vehicle having an operator location for the operator of said vehicle, a battery, a main disconnect switch arranged when closed to connect said battery to the operating circuits of said vehicle and engine thereof, said vehicle having a plurality of fluid level conditions, operating conditions and service conditions, said vehicle having a condition-responsive means associated with each of said conditions, each condition-responsive means being operable to signal the existence of an undesirable state in the condition with which it is associated, the improvement comprising:
   a. first, second and third indicator panels mounted on said vehicle, at least said second panel being disposed at said operator location,
   b. said first panel having a plurality of visually observable indicators each associated with a different fluid-level-condition-responsive means, said first panel including means operable when said first panel is energized to individually energize said first panel indicators in response to an undesirable-state operation of the fluid-level-condition-responsive means associated therewith,
   c. means connecting said first panel to said battery for energization of said first panel from said battery during at least a portion of the time said main disconnect switch is closed,
   d. means responsive to an engine-operating condition for inhibiting energization of said first panel indicators during operation of said engine,
   e. said second panel having a plurality of visually observable indicators each associated with a different operating-condition-responsive means, said second panel including means operable when said second panel is energized to individually energize said second panel indicators in response to an undesirable-state operation of the operating-condition-responsive means associated therewith,
   f. means for connecting said second panel to said battery for energization of said second panel from said battery during the time said main disconnect switch is closed,
   g. said third panel having a plurality of visually observable indicators each associated with a different service-condition-responsive means, said third panel including means operable when said third panel is energized to individually energize said third panel indicators in response to an undesirable-state operation of the service-condition-responsive means associated therewith and for latching energized indicators in an energized state, said third panel further including manually operable reset means for unlatching energized indicators,
   h. means for connecting said third panel directly across said battery for energization of said third panel from said battery irrespective of whether said main disconnect switch is open or closed, i. means responsive to an engine-operating condition for inhibiting energization of any of said third panel indicators by said service-condition-responsive means during the time when said engine is not in operation.

2. A monitor system as set forth in claim 1 and further including a first manually operable test switch mounted on said vehicle at said operator location, said test switch having open and closed positions,
means operatively associated with said first test switch and said first and second panels for energizing all of said first and second panel indicators when said test switch is in one of its positions,
a second manually operable test switch disposed in close adjacency with said third panel indicators, said test switch having open and closed positions,
means operatively associated with said second test switch and said third panel for energizing all of said third panel indicators when said test switch is in one of its positions.

3. A monitor system as set forth in claim 1 and further including:
an additional visually observable indicator included in one of said first or second panels,
means for energizing said additional indicator during the time that any of said third panel indicators are energized.

4. A monitor system as set forth in claim 1 and further including:
a further visually observable indicator operatively associated with said second panel,
means for energizing said further indicator during the time that any of said second panel indicators is energized.

5. A monitor system as set forth in claim 4 and further including:
an additional visually observable indicator included in one of said first or second panels,
means for energizing said additional indicator during the time that any of said third panel indicators are energized.

6. A monitor system as set forth in claim 5 and further including:
a first manually operable test switch mounted on said vehicle at said operator loaction, said test switch having open and closed positions,
means operatively associated with said test switch and said first and second panels for energizing all of said first and second panel indicators when said test switch is in one of its positions,
a second manually operable test switch disposed in close adjacency with said third panel indicators, said test switch having open and closed positions,
means operatively associated with said test switch and said third panel for energizing all of said third panel indicators when said test switch is in one of its positions.

7. A monitor system as set forth in claim 1, wherein said second panel indicators are low-intensity lights and further including:
a high-intensity light mounted on said vehicle and visually observable from said operator location,
means for energizing said high-intensity light during the time that any of said second panel indicators are energized.

8. A monitor system as set forth in claim 1 wherein said second panel indicators are low-intensity lights, and wherein preselected of said second panel indicators are critical-condition indicators and the remainder of said second panel indicators are noncritical-condition indicators, said system further including:
a high-intensity light mounted on said vehicle and visually observable from said operator location,
means associated with said high-intensity light and with said second panel for energizing said high-intensity light during the time that any of said second panel indicators are energized,
an audible indicator mounted on said vehicle and audible at said operator location,
means associated with said audible indicator for energizing said audible indicator during the time that any of said second panel critical-condition indicators are energized.

9. A monitor system as set forth in claim 8 and further including means responsive to operation of said engine for inhibiting energization of said audible indicator during the time that said engine is not operating.

10. A monitor system as set forth in claim 8 and further including means including an oscillator for repeatedly turning said high-intensity light and said audible indicator on and off during the energization thereof and at the rate of oscillation of said oscillator.

11. A monitor system as set forth in claim 8 and further including:
a first manually operable test switch mounted on said vehicle at said operator location, said test switch having open and closed positions,
means operatively associated with said test switch and said first and second panels for energizing all of said first and second panel indicators when said test switch is in one of its positions,
a second manually operable test switch disposed in close adjacency with said third panel indicators, said test switch having open and closed positions,
means operatively associated with said test switch and said third panel for energizing all of said third panel indicators when said test switch is in one of its positions.

12. A monitor system as set forth in claim 11 and further including means including an oscillator for repeatedly turning said high-intensity light and said audible indicator on and off during the energization thereof and at the rate of oscillation of said oscillator.

13. A monitor system as set forth in claim 8 and further including:
an additional low-intensity indicator light included in one of said first or second panels,
means for energizing said additional light during the time that any of said third panel indicators are energized.

14. A monitor system as set forth in claim 13 and further including means responsive to operation of said engine for inhibiting energization of said audible indicator during the time that said engine is not operating.

15. A monitor system as set forth in claim 13 and further including means including an oscillator for repeatedly turning said high-intensity light and said audible indicator on and off during the energization thereof and at the rate of oscillation of said oscillator.

16. A monitor system as set forth in claim 13 and further including:

a first manually operable test switch mounted on said vehicle at said operation location, said test switch having open and closed positions, means operatively associated with said test switch and said first and second panels for energizing all of said first and second panel indicators when said test switch is in one of its positions, a second manually operable test switch disposed in close adjacency with said third panel indicators, said test switch having open and closed positions, means operatively associated with said test switch and said third panel for energizing all of said third panel indicators when said test switch is in one of its positions.

* * * * *